(12) United States Patent
Kim et al.

(10) Patent No.: US 7,884,567 B2
(45) Date of Patent: Feb. 8, 2011

(54) FUEL CELL SYSTEM AND METHOD FOR CONTROLLING OPERATION OF THE FUEL CELL SYSTEM

(75) Inventors: Dong-rak Kim, Yongin-si (KR); Sung-won Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 674 days.

(21) Appl. No.: 11/874,819

(22) Filed: Oct. 18, 2007

(65) Prior Publication Data
US 2008/0116843 A1 May 22, 2008

(30) Foreign Application Priority Data
Nov. 16, 2006 (KR) .................... 10-2006-0113277

(51) Int. Cl.
*H01M 10/44* (2006.01)
*H02J 7/00* (2006.01)
(52) U.S. Cl. .................... 320/101; 429/7; 429/400
(58) Field of Classification Search .............. 320/101
See application file for complete search history.

(56) References Cited

U.S. PATENT DOCUMENTS

| | | | |
|---|---|---|---|
| 4,670,702 A | 6/1987 | Yamada et al. | |
| 4,839,246 A | 6/1989 | Takabayashi | |
| 6,184,593 B1 | 2/2001 | Jungreis | |
| 6,635,373 B2 | 10/2003 | Kobayashi | |
| 2002/0047309 A1 | 4/2002 | Droppo et al. | |
| 2003/0022031 A1* | 1/2003 | Manery | 429/7 |
| 2006/0240291 A1* | 10/2006 | Kim et al. | 429/9 |
| 2007/0269692 A1* | 11/2007 | Chen et al. | 429/23 |

FOREIGN PATENT DOCUMENTS

EP  1 311 048 A3  2/2005

(Continued)

OTHER PUBLICATIONS

Patent Abstracts of Japan, Publication No. 2003-032906; Date of Publication: Jan. 31, 2003; in the name of Akihito Hayano, et al.

(Continued)

*Primary Examiner*—Edward Tso
*Assistant Examiner*—M'Baye Diao
(74) *Attorney, Agent, or Firm*—Christie, Parker & Hale, LLP (57) ABSTRACT

Fuel cell systems and methods for controlling fuel cell systems. In one embodiment, the method includes supplying power produced by operating the fuel cell stack in a maximum output mode to the load while concurrently charging the secondary cell with the produced power when an amount of charge of the secondary cell is smaller than a first standard value, supplying both power produced by operating the fuel cell stack in a stable output mode and the power discharged by the secondary cell to the load when the amount of charge of the secondary cell is larger than a second standard value, and maintaining an existing output mode among the output modes when the amount of charge of the secondary cell is larger than the first standard value and smaller than the second standard value.

11 Claims, 3 Drawing Sheets

FOREIGN PATENT DOCUMENTS

| | | |
|---|---|---|
| EP | 1 306 958 A3 | 5/2005 |
| JP | 2001-339872 | 12/2001 |
| JP | 2003-32906 | 1/2003 |
| KR | 10-2006-0093539 | 8/2006 |
| KR | 10-2006-0135142 | 12/2006 |
| KR | 10-2007-0039358 | 4/2007 |
| WO | WO 02/21659 A1 | 3/2002 |
| WO | WO 2004/038892 A2 | 5/2004 |
| WO | WO 2004/093288 A1 | 10/2004 |
| WO | WO 2005/029672 A1 | 3/2005 |

OTHER PUBLICATIONS

Patent Abstracts of Japan for Publication No. 2001-339872; dated Dec. 7, 2001 in the name of Shotaro Naito.

Korean Patent Abstracts for Publication No. 10-2006-0093539; dated Aug. 25, 2006 in the name of An, Jin Hong, et al.

Korean Patent Abstracts for Publication No. 10-2006-0135142; dated Dec. 29, 2006 in the name of Jang, Won Hyouk, et al.

Korean Patent Abstracts for Publication No. 10-2007-0039358; dated Apr. 11, 2007 in the name of An, Jin Hong, et al.

European Search Report for corresponding European Application No. EP 07 12 0310.3 dated Jul. 2, 2008 indicating the relevance of the cited references herein.

* cited by examiner

FUEL CELL SYSTEM AND METHOD FOR CONTROLLING OPERATION OF THE FUEL CELL SYSTEM

CROSS-REFERENCE TO RELATED APPLICATIONS

This application claims priority to and the benefit of Korean Patent Application No. 10-2006-0113277, filed on Nov. 16, 2006, in the Korean Intellectual Property Office, the entire content of which is incorporated herein by reference.

BACKGROUND

The present invention relates to a system and method for controlling operation of a fuel cell system having a secondary cell, and more particularly to a system and method for maintaining stable output power of a fuel cell system.

A fuel cell is a power generation system that generates electric energy by a well-balanced electrochemical reaction between hydrogen contained in a hydro-carbonaceous material such as methanol, ethanol and natural gas, and oxygen in the air.

Fuel cells can be sorted according to the type of electrolyte used. Examples include a phosphoric acid fuel cell, a molten carbonate fuel cell, a solid oxide fuel cell, a polymer electrolyte fuel cell and an alkaline fuel cell, etc. These fuel cells are generally operated based on the same principle, but are often different in view of the types of fuels used, operating temperatures, catalyst and electrolytes used, among other differences.

A polymer electrolyte membrane fuel cell (PEMFC) has the advantage of a remarkably high output feature, a low operating temperature, quick start and quick response over other fuel cells. In addition, the PEMFC is widely used as a transportable power source for a portable electronic apparatus or a vehicle as well as a distributed power source such as a stationary power plant for a house and a public structure.

A direct methanol fuel cell (DMFC), which is similar to the PEMFC, supplies directly liquefied methanol fuel to a stack. Unlike the PEMFC, the DMFC does not need to use the reformer to obtain hydrogen from fuel, so it can be small in size.

The typical fuel cell system includes a fuel cell stack for generating power using an electrochemical reaction, a fuel cell stack control circuit, a power supply circuit, where the fuel cell stack control circuit controls the operation of the fuel cell stack. The conventional fuel cell system operates such that it matches its output to the load by controlling a degree of the operation of the fuel cell system depending on the magnitude of the load connected to it. A fuel cell system may also include a secondary cell. In the case of using a secondary cell, the fuel cell is used to charge the secondary cell which can supply the output power of the secondary cell to the load regardless of variation of the load.

However, in the conventional way, the amount or the concentration of the fuel, which is supplied to the fuel cell, may be controlled by the amount of an output, which the fuel cell produces. If the amount or the concentration of the fuel is controlled incorrectly, the operating efficiency and the durability of the fuel cell system are deteriorated. But it is difficult to control mechanically the amount or the concentration of the fluid fuel to meet the magnitude of the load, which is electrically variable at high speed.

In the case using a secondary cell, power is stably supplied to the load from the cell, but the capacity of the secondary cell needs to be large enough. However, enlarging the capacity of the secondary cell is expensive and causes the cost to increase for the whole system.

SUMMARY OF THE INVENTION

Embodiments of the present invention can provide a fuel cell system and a method for controlling operation of the fuel cell system capable of supplying stable power to a load. In one embodiment, the fuel cell system is provided at low cost.

In one embodiment, the invention relates to a method that includes supplying power produced by operating the fuel cell stack in a maximum output mode to the load while concurrently charging the secondary cell with the produced power when an amount of charge of the secondary cell is smaller than a first standard value, supplying both power produced by operating the fuel cell stack in a stable output mode and the power discharged by the secondary cell to the load when the amount of charge of the secondary cell is larger than a second standard value; and maintaining an existing output mode among the output modes when the amount of charge of the secondary cell is larger than the first standard value and smaller than the second standard value.

In another embodiment, the invention relates to a fuel cell system that includes a fuel cell stack for producing power using an electrochemical reaction between fuel and an oxidizer, a secondary cell for storing and discharging power, a stack voltage converting circuit for converting a voltage produced by the fuel cell stack and for transferring the converted voltage to a load node, where an output terminal of the secondary cell and a load are connected to the load node, and a voltage converting controller for controlling a conversion ratio of the stack voltage converting circuit so that a voltage on an output line of the stack voltage converting circuit and a voltage on an output line of the secondary cell are the same at the load node.

In yet another embodiment, the invention relates to a fuel cell system that includes a fuel cell stack for producing power by an electrochemical reaction between fuel and an oxidizer, a secondary cell for storing and discharging power, a secondary cell voltage converting circuit for converting a voltage discharged from the secondary cell and for transferring the converted voltage to a load node where an output terminal of the fuel cell stack and a load are connected to the load node, and a voltage converting controller for controlling a conversion ratio of the secondary cell voltage converting circuit so that a voltage on an output line of the second cell voltage converting circuit and a voltage on an output line of the fuel cell stack are the same at the load node.

In still yet another embodiment, the invention relates to a fuel cell system and a method for controlling operation of the fuel cell system capable of supplying stable power to the load using a secondary cell having a small charge capacity.

In one embodiment, the invention relates to a fuel cell system and a method for controlling operation of the fuel cell system capable of supplying stable power to the load in spite of quick variations in the magnitude of the load.

In another embodiment, the invention relates to a method for controlling the fuel cell system including controlling operation of the fuel cell system transferring discharged power of the secondary cell and produced power of the fuel cell stack to the load in a parallel way, supplying power produced by operating the fuel cell stack with a maximum output mode to the load and charging the secondary cell with the produced power at the same time when the amount of charge of the secondary cell is smaller than a predetermined first standard value; supplying power produced by operating the fuel cell stack with a stable output mode and discharged power of the secondary cell to the load together when the amount of charge of the secondary cell is larger than a predetermined second standard value; and maintaining a previous operation state when the amount of charge of the secondary cell is larger than the first standard value and smaller than the second standard value.

In yet another embodiment, the invention relates to a fuel cell system including a fuel cell stack producing power by an electrochemical reaction between fuel and an oxidizer; a secondary cell discharging power caused by charged electric charges; a stack voltage converting circuit for converting a voltage discharged from the fuel cell stack and transferring the converted voltage to a load node where an output terminal of the secondary cell and an outside load are connected to each other; and a voltage converting controller for controlling a conversion ratio of the stack voltage converting circuit so that a voltage on an output line of the stack voltage converting circuit and a voltage on an output line of the secondary cell are same in the load node.

In still yet another embodiment, the invention relates to a fuel cell system including a fuel cell stack producing power by an electrochemical reaction between fuel and oxidizer; a secondary cell discharging power caused by charged electric charges; a secondary cell voltage converting circuit for converting a discharged voltage of the secondary cell and transferring the converted voltage to a load node where an output terminal of the fuel cell stack and an outside load are connected to each other; and a voltage converting controller for controlling a conversion ratio of the secondary cell voltage converting circuit so that a voltage on an output line of the second cell voltage converting circuit and a voltage on an output line of the fuel cell stack are same in the load node.

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
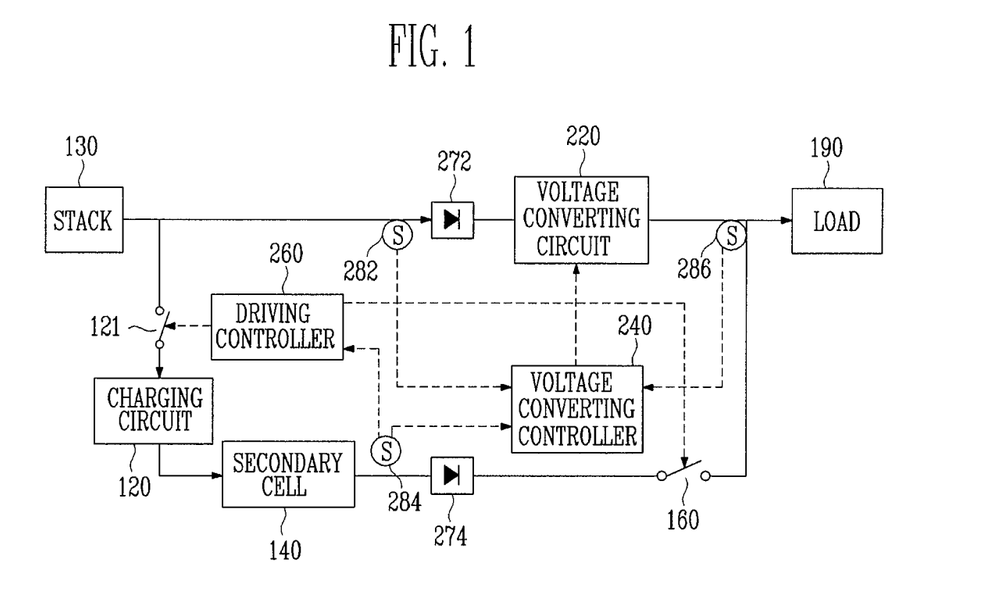
FIG. 1 is a schematic block diagram illustrating the structure of a fuel cell system according to an embodiment of the present invention.

FIG. 1 is a schematic block diagram illustrating a fuel cell system with a stack voltage converter according to an embodiment of the present invention.

The fuel cell system illustrated in FIG. 1 includes a fuel cell stack 130 for producing power by an electrochemical reaction between fuel and oxidizer; a secondary cell 140 for storing power in the form of electric charges, and for discharging power; a stack voltage converting circuit 220 for converting voltage produced by the fuel cell stack and for transferring the converted voltage to a load node which connects an output terminal of the secondary cell and an outside load; and a voltage converting controller 240 for controlling the conversion ratio of the stack voltage converting circuit 220 such that the voltage of the output of the stack voltage converting circuit 220 and the voltage of the output of the secondary cell 140 are the same at the load node.

In many embodiments, the likelihood that reverse current flows back from the load to the fuel cell stack or secondary cell is low based on the operation of the voltage converting circuit 220. However, to ensure the prevention of undesirable reverse current and substantial damage to the fuel cell stack and/or secondary cell, the output terminals of the fuel cell stack 130 and/or secondary cell 140 are equipped with diodes 272, 274 for preventing reverse current.

The fuel cell system further includes the output terminal of the fuel cell stack, the output terminal of the secondary cell and three apparatuses 282, 284, 286 for measuring voltage at a node in order to collect data which is standard for controlling operation of the voltage converting controller 240. Positions of any of the three apparatuses 282, 284, 286 for measuring voltage may be changed or any of the apparatuses may be omitted depending on implementation. For example, as described above, the two voltage measuring apparatuses 282, 284 for the output terminal of the fuel cell stack and the output terminal of the secondary cell may be implemented to measure the voltage of the diodes 272, 274 on either the anode side or the cathode side (i.e., the input or output of the diode).

For example, if the fuel cell stack 130 is driven at a constant voltage, the apparatus 282 for measuring the voltage of the output terminal of the fuel cell stack can be omitted. In addition, if the fuel cell stack 130 is driven to serve a constant load, the apparatus 286 for measuring the voltage of the load node can be omitted.

In the fuel cell system described above, the fuel cell stack and the secondary cell stably and efficiently supply power to the load concurrently, but if the secondary cell is discharged, the fuel cell stack is not operated since the fuel cell stack follows the discharged voltage. Accordingly, a charging circuit and a charging method can be used to charge the secondary cell using part of the current produced by the fuel cell stack while the stack supplies power to the load.

That is, the fuel cell system may have a structure which charges the secondary cell using power produced by the fuel cell stack while supplying power to the load, and a structure which isolates the secondary cell from the load while charging the secondary cell. To this end, the fuel cell system illustrated in the drawings further includes a load switch 160 for isolating the secondary cell from the load when charging the secondary cell; a charging circuit 120 for charging the secondary cell using the power produced from the fuel cell stack; and a driving controller 260 for controlling the operational mode of the fuel cell stack 130 and charging operation of the charging circuit 120.

A switch 121 can be used by the driving controller 260 to control the charging circuit 120. The charging circuit control switch 121 and the load switch 160 operate opposite to each other, such that when one switch is on, the other is off.

The charging circuit 120 transfers a portion of the total power produced from the fuel cell stack 130 to the secondary cell, according to a power ratio (e.g., predetermined power ratio), and converts the voltage produced by the fuel cell stack 130 into a voltage suitable for charging the secondary cell 140. The latter is a function that can be implemented using a general booster circuit and/or a voltage level shifter circuit which are known to one skilled in the art.

The power ratio is a function of a power distribution controller that is configured to maintain a distribution ratio of the power delivered to the load and the power delivered to charge the secondary cell when it is being charged. The power ratio may be implemented by controlling impedances. For example, the power ratio may be implemented by using a fixed resistance for the input impedance of the secondary cell and the input impedance of the load.

The driving controller 260 determines the amount of charge using a sensing signal received from the voltage measuring apparatus 284 disposed at the output terminal of the secondary cell. If the driving controller 260 determines that the amount of charge is insufficient, it opens the load switch 160 and closes the charging circuit switch 121, thereby starting to charge the secondary cell again. Also, the driving controller 260 allows the fuel cell stack 130 to operate at a maximum operation mode during the charging of the secondary cell, and the fuel cell stack 130 to operate at a stable operation mode during discharge of the secondary cell. Accordingly, the fuel cell stack 130 is operated in either the maximum operation mode, producing much more power, or the stable operation mode, producing much less power.

In one embodiment, the driving controller 260 can be divided into a portion for controlling the two switches 121, 160 and a portion for controlling the operation mode of the fuel cell stack 130. In another embodiment, the voltage converting controller 240 can perform these functions.

In another embodiment, the driving controller 260 may directly measure the state of charge (SOC) of the secondary cell without using the voltage measuring apparatus 284 when determining the amount of charge stored in the secondary cell.

Figure 2:
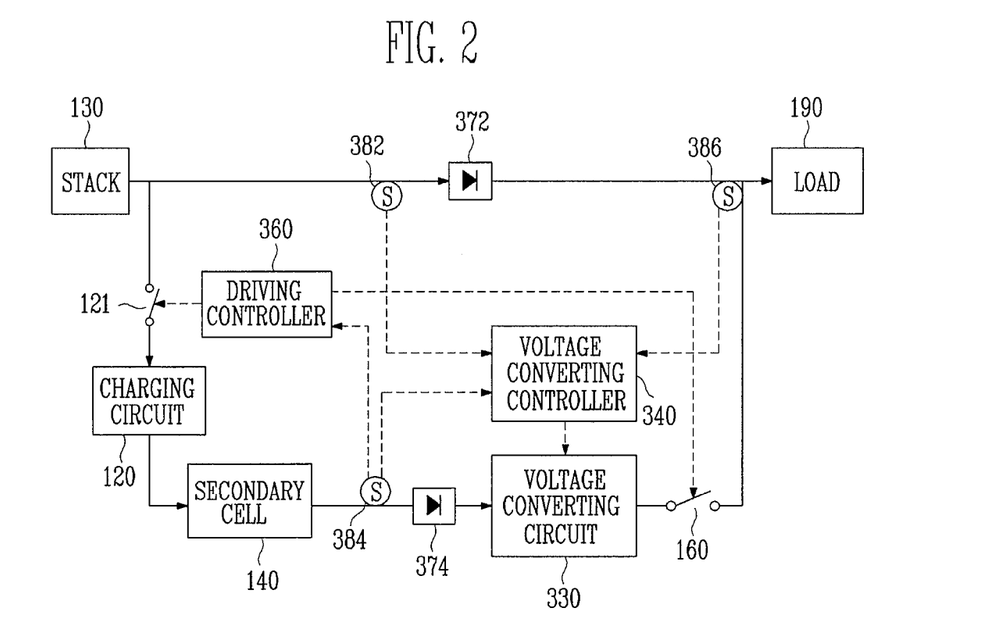
FIG. 2 is a schematic block diagram illustrating the structure of a fuel cell system according to another embodiment of the present invention.

FIG. 2 illustrates a schematic block diagram of a fuel cell system with a voltage converter for the secondary cell according to an embodiment of the present invention.

The fuel cell system shown in FIG. 2 includes a fuel cell stack 130 for producing power by an electrochemical reaction between fuel and an oxidizer; a secondary cell 140 for storing power in the form of electric charges and for discharging power; a secondary cell voltage converting circuit 330 for transferring voltage discharged from the secondary cell to a load node where an output terminal of the fuel cell stack 130 and an outside load are connected to each other after converting the voltage discharged from the secondary cell; and a voltage converting controller 340 for controlling the conversion ratio of the secondary cell voltage converting circuit such that the voltage on the output line of the secondary cell voltage converting circuit and the voltage on the output line of the fuel cell stack are the same at the load node.

The fuel cell system shown in FIG. 2 includes diodes 372, 374 for preventing reverse current from flowing into the output terminals of the fuel cell stack 130 and secondary cell 140.

The fuel cell system further includes three voltage measuring apparatuses 382, 384, 386 for respectively measuring the voltage of the output terminal of the fuel cell stack 130, the voltage of the output terminal of the secondary cell 140 and the voltage of the connecting node to collect standard data for controlling the operation of the voltage converting controller 340 as illustrated in FIG. 2. In one embodiment, the positions of any of the three voltage measuring apparatuses 382, 384, 386 may be changed or any of the apparatuses may be omitted. Particularly, the voltage measuring apparatus 382 disposed at the output terminal of the fuel cell stack 130 can be omitted in the implementation where the fuel cell stack 130 is operated with constant output power.

The fuel cell system shown in FIG. 2 can include a structure which charges the secondary cell using the power produced from the fuel cell stack while concurrently supplying power to the load, and a structure which can isolate the secondary cell from the load when the secondary cell is charging. To this end, the fuel cell system illustrated in the drawings further includes a load switch 160 for isolating the secondary cell from the load when charging the secondary cell; a charging circuit 120 for charging the secondary cell using power produced by the fuel cell stack; and a driving controller 360 for controlling the operational mode of the fuel cell stack 130 and charging operation of the charging circuit 120.

A switch 121 for controlling the charging circuit 120 and the load switch 160 for isolating the load are operated opposite to each other, such that when one switch is on, the other is off.

The charging circuit 120 transfers a portion of the total power produced from the fuel cell stack 130 to the secondary cell, according to a power ratio (e.g., predetermined power ratio), and converts the voltage produced by the fuel cell stack 130 into a voltage suitable for charging the secondary cell 140.

The latter function can be implemented using a general booster circuit and/or a voltage level shifter, and the former function is implemented by controlling impedances. For example, the former function may be implemented using fixed resistances for the input impedance of the secondary cell and the input impedance of the load.

The driving controller 360 determines the amount of charge using a sensing signal received from the voltage measuring apparatus 384 disposed at the output terminal of the secondary cell. If the driving controller 360 recognizes that the amount of charge is insufficient, it opens the load switch 160 and closes the charging circuit switch 121, thereby starting to charge the secondary cell. Also, the driving controller 360 allows the fuel cell stack 130 to operate at a maximum operation mode during the charging of the secondary cell, and the fuel cell stack 130 to operate in a stable operation mode during discharge of the secondary cell. Accordingly, the fuel cell stack 130 is operated in either of the maximum operation mode, producing much more power, or the stable operation mode, producing much less power.

In one embodiment, the driving controller 360 can be divided into a portion for controlling the two switches 121, 160 and a portion for controlling the operation mode of the fuel cell stack 130. In another embodiment, the voltage converting controller 340 can perform these functions.

In one embodiment, the driving controller 360 can directly measure the SOC of the secondary cell without using the voltage measuring apparatus 384 when determining the amount of charge of the secondary cell.

Figure 3:
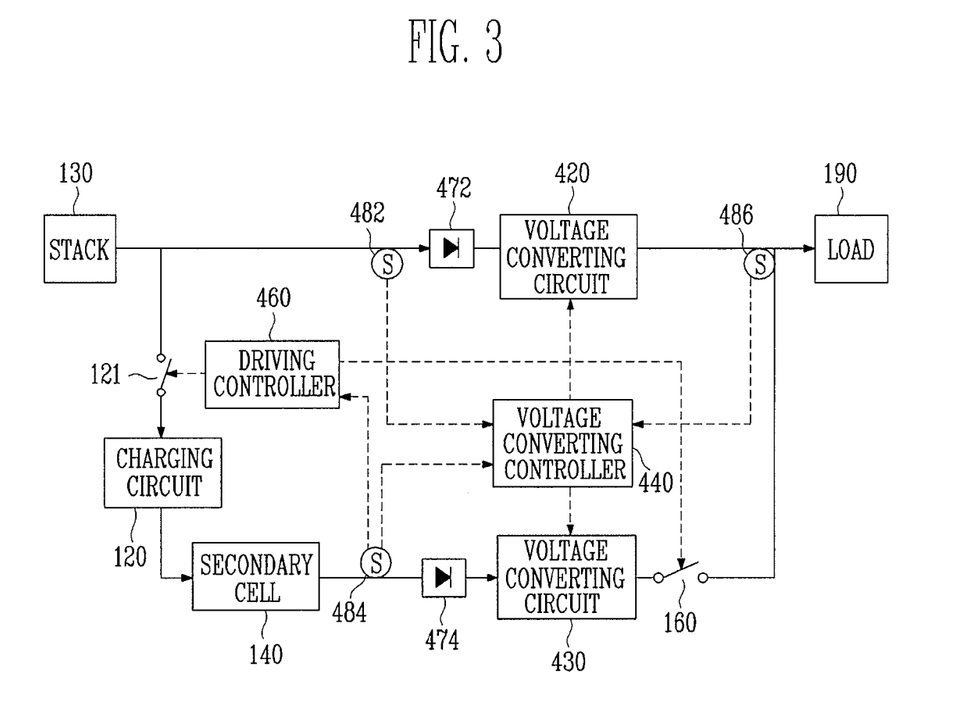
FIG. 3 is a schematic block diagram illustrating the structure of a fuel cell system according to another embodiment of the present invention.

FIG. 3 illustrates a schematic block diagram of a fuel cell system with a stack voltage converting circuit and a secondary cell voltage converting circuit according to an embodiment of the present invention.

The fuel cell system shown in FIG. 3 includes a fuel cell stack 130 for producing power by an electrochemical reaction between fuel and an oxidizer; a secondary cell 140 for storing power in the form of electric charges and for discharging power; a stack voltage converting circuit 420 for converting the voltage produced by the fuel cell stack and for transferring the produced voltage to a load terminal where an outside load is connected; a secondary cell voltage converting circuit 430 for converting the voltage discharged from the secondary cell and for transferring the converted voltage to a load terminal where an outside load is connected; and a voltage converting controller 440 for controlling the conversion ratio of the stack voltage converting circuit 420 and the secondary cell voltage converting circuit 430 such that the voltage on the output line of the fuel cell stack and the voltage on an output line of the secondary cell are the same at the load node.

The fuel cell system shown in FIG. 3 includes diodes 472, 474 for preventing reverse current from flowing into output terminals of the fuel cell stack 130 and secondary cell 140. The fuel cell system further includes three voltage measuring apparatuses 482, 484, 486 for respectively measuring the voltage of the output terminal of the fuel cell stack 130, the voltage of the output terminal of the secondary cell 140 and the voltage of the connecting node in order to collect standard data for controlling operation of the voltage converting controller 440 as illustrated in FIG. 3.

The fuel cell system shown in FIG. 3 may have increased cost by having the voltage converting circuits of the fuel cell stack and the secondary cell, but also can actively adapt, using the two voltage converting circuits 420, 430, according to conditions of the load. For example, in the case that the output voltages of the fuel cell stack 130 and secondary cell 140 are the same, although the voltage needed for the load is not the same, the voltage supplied to the load 190 can be changed to the voltage needed for the load using the two voltage converting circuits 420, 430.

The fuel cell system shown in FIG. 3 further includes a load switch 160 for isolating the secondary cell from the load; a charging circuit 120 for charging the secondary cell using the power produced by the fuel cell stack; and a driving controller 460 for controlling the operational mode of the fuel cell stack 130 and charging operation of the charging circuit 120.

The detailed features of the remaining constituent elements of the fuel cell system illustrated in FIG. 3 are not described herein since it is possible to analogize from the description of FIG. 1 and FIG. 2.

In accordance with one embodiment of the present invention, a method of concurrently transferring power from the fuel cell stack and power from the secondary cell to the load for the fuel cell system in FIG. 1 to FIG. 3 will be described.

The voltage converting controller 440 acts to control the conversion ratio of the voltage of the fuel cell stack to the voltage of the secondary cell according to the amount of power needed for the load, and to match the voltage of the fuel cell stack and the voltage of the secondary cell in order to prevent the voltages of the fuel cell stack and the secondary cell from flowing to each other. Accordingly, although the voltage is lowered by the discharge of the secondary cell, the secondary cell may supply power to the load with the fuel cell stack in parallel for a substantial amount of time.

In the illustrated embodiment of the present invention, when viewing from the node connected to the load, the fuel cell stack and the secondary cell are power supply connected in parallel. Accordingly, the fuel cell stack and the secondary cell transfer power to the load by discharging power using a constant current ratio. The discharged current ratio is gradually changed such that the discharged current ratio of the fuel cell stack becomes higher in accordance with the discharge of the secondary cell if the secondary cell is not charged.

In operation, when instantaneous power demand is increased due to a suddenly increasing magnitude of the load, the fuel cell stack has difficulty in increasing the output current rapidly, but the secondary cell may increase rapidly the discharged current to meet the increased magnitude of the load. Accordingly, the fuel cell system according to one embodiment of the present invention not only supplies power to the load stably but also does not need to change the driving state of the fuel cell stack often, thereby guaranteeing the fuel cell stack to be driven stably and efficiently.

However, as described above, in order to prevent the secondary cell from being fully discharged, the secondary cell can be charged by power produced from the fuel cell stack while the fuel cell stack and the secondary cell supply power to the load in parallel.

Figure 4:
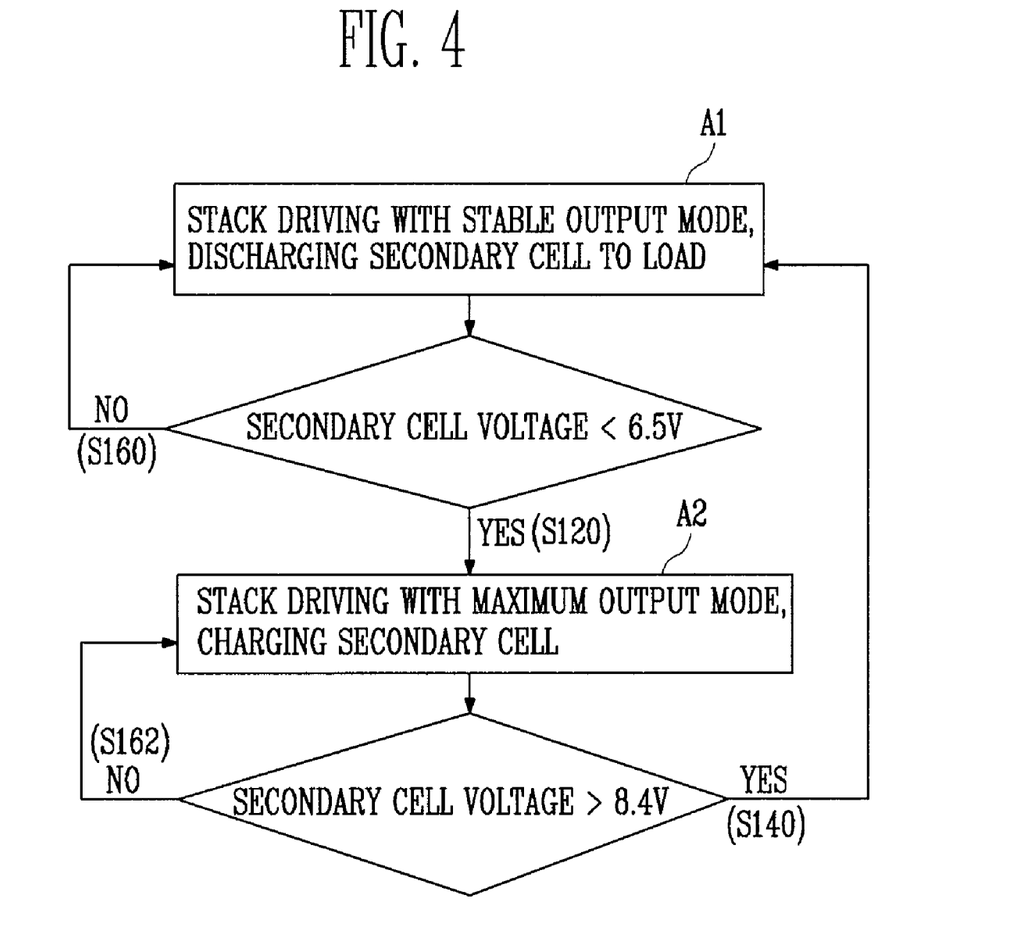
FIG. 4 is a flow diagram illustrating a method of driving a fuel cell system according to an embodiment of the present invention.

FIG. 4 is a flow diagram that illustrates a method of controlling operation of the fuel cell system, which charges the secondary cell using power produced from the fuel cell stack according to an exemplary embodiment of the present invention. The method of controlling operation shown in FIG. 4 includes determining, while the stack is driven in stable output mode and the secondary cell is being discharged to the load (A1), if the amount of charge of the secondary cell is smaller than a first standard value (S120), supplying power produced by operating the fuel cell stack in the maximum output mode to the load while concurrently charging the secondary cell with the produced power (A2); determining if the amount of charge of the secondary cell is larger than a second standard value (S140), supplying power produced by operating the fuel cell stack in a stable output mode while concurrently discharging power from the secondary cell to the load (A1); and maintaining the state of previous operation of the fuel cell if the amount of charge measured from the secondary cell is larger than a first standard value (S160) or if the amount of charge measured from the secondary cell is smaller than a second standard value (S162). In one embodiment, at least one of the first standard value or the second standard value is predetermined.

In the embodiment illustrated in FIG. 4, the fuel cell has a normal output of 30 W and a maximum output of 40 W. In such case, the first standard value is 6.5V and the second standard value is 8.4V which correspond to the voltage value at the output terminal of the secondary cell. In other embodiments, the standard values may be provided with other values or a SOC value may be used as a parameter to measure the amount of charge of the secondary cell instead of the voltage of the output terminal of the secondary cell.

According to the method of controlling operation of the embodiment shown in FIG. 4, the fuel cell system is operated in one of the two following states of operation. In the first state A1, the fuel cell stack is operated in a stable output mode, which produces lower power, and the output lines of the secondary cell and fuel cell stack have a connecting structure of providing power to the load in parallel. In the second state A2, the fuel cell stack is operated in a maximum output mode, which produces higher power, and the output lines of the secondary cell and fuel cell stack have a connecting structure such that some of the power produced from the fuel cell stack is transferred to the load and the remaining power can be used to charge the secondary cell.

Although one standard value is sufficient when selecting one of the two states of operation, two standard values are used in the method of operation for the embodiment. The reason is as follows.

In the illustrated embodiment of the fuel cell system, the fuel supply is not the same according to each mode of operation. If the mode of operation changes often, the durability of the fuel cell system is reduced. Accordingly, the state of operation is maintained for a substantial period of time in the illustrated embodiment because the state of operation of the fuel cell system is changed using the two standard values.

For example, as shown in FIG. 4, if the voltage of the secondary cell is lower than 6.5V, the fuel cell system remains in the state A2 and the voltage of the secondary cell rises gradually, resulting in exceeding 6.5V. The state A2 is maintained until the voltage of the secondary cell exceeds 8.5V, not being changed immediately.

In the embodiment of FIG. 4, the method for controlling operation of the fuel cell system includes the fuel cell stack operating in one of two output modes according to the amount of power produced, and the switching structure for charging the secondary cell and supplying power to the load. Accordingly, the method for controlling operation of the fuel cell system according to the embodiment of FIG. 4 is suitable for use with the fuel cell system of FIG. 1 to FIG. 3. The driving controllers 260, 360, 460 shown in the drawings can perform the method for controlling operation of the fuel cell system.

In one embodiment, the driving controller for distributing power and measuring SOC of the secondary cell and the voltage converting controller are implemented using a low power microcontroller such as the MSP 430, produced by Texas Instruments (TI) of Dallas, Tex., and the charging circuit for charging the secondary cell is implemented using a charge controller such as the Bq 24700, also produced by TI.

In the embodiment illustrated in FIG. 4, if the amount of charge of the secondary cell is lower than the first standard value, the stack is operated in a maximum output mode and a ratio of charging current of the charging circuit is controlled such that the secondary cell is charged with the power produced from the stack that is not used for the load. To this end, the MSP 430 can determine the proper ratio of charging current after monitoring the voltage of the load and applies the voltage value I_set of the chip Bq 24700 according to the determination.

On the other hand, if the amount of charge of the secondary cell is larger than the second standard value, the stack is operated in a stable output mode and the output of the secondary cell is connected to the load when the amount of power used for the load exceeds the amount of the power produced from the stack. To this end, the MSP 430 converts a feedback voltage value from a voltage converting circuit (e.g. DC/DC converter) after monitoring the voltage at the load.

In one embodiment for determining the operational modes, if the SOC, which indicates directly the amount of charge of the secondary cell, is used, the MSP 430 monitors current output of the secondary cell. After subtracting or adding the monitored current from the whole capacity of the secondary cell, the resulting value of SOC is recorded.

In exemplary embodiments, stable power may be supplied to the load at a low price by implementing the fuel cell system and the method for controlling operation of the present invention according to the above structure.

In exemplary embodiments, the fuel cell system and the method for controlling operation of the present invention may supply stable power to the load using a secondary cell having small capacity.

Further, embodiments of the fuel cell system and the method for controlling operation of the present invention may supply stable power to the load in spite of sudden variations in the load and may prevent the fuel cell from being damaged.

Although certain embodiments of the present invention have been shown and described, it would be appreciated by those skilled in the art that changes might be made without departing from the principles and spirit of the invention, the scope of which is defined in the claims and their equivalents.

What is claimed is:

1. A fuel cell system comprising:
a fuel cell stack for producing power using an electrochemical reaction between fuel and an oxidizer;
a secondary cell for storing and discharging power;
a stack voltage converting circuit for converting a voltage produced by the fuel cell stack and for transferring the converted voltage to a load node, where an output terminal of the secondary cell and a load are connected to the load node;
a voltage converting controller for controlling a conversion ratio of the stack voltage converting circuit so that a voltage on an output line of the stack voltage converting circuit and a voltage on an output line of the secondary cell are the same at the load node;
a charging circuit for charging the secondary cell with power produced from the fuel cell stack; and
a driving controller for controlling at least two output modes of the fuel cell stack and operation of the charging circuit,
wherein the fuel cell stack is operated in one of the at least two output modes at which the fuel cell stack outputs power at different levels.

2. The fuel cell system according to claim 1, wherein the driving controller is adapted to control operation of the fuel cell according to the following method:
supplying power produced by operating the fuel cell stack in a maximum output mode to the load while concurrently charging the secondary cell with the power produced by operating the fuel cell when an amount of charge of the secondary cell is smaller than a first standard value;
supplying both power produced by operating the fuel cell stack in a stable output mode and the power discharged by the secondary cell to the load when the amount of charge of the secondary cell is larger than a second standard value; and
maintaining an existing output mode among the output modes when the amount of charge of the secondary cell is larger than the first standard value and smaller than the second standard value.

3. The fuel cell system according to claim 1, further comprising a load switch disposed between an output of the secondary cell and the load.

4. The fuel cell system according to claim 1, further comprising a first voltage measuring apparatus for measuring an output voltage of the secondary cell, and a second voltage measuring apparatus for measuring voltage at the load.

5. The fuel cell system according to claim 1, further comprising a secondary cell voltage converting circuit for converting a discharged voltage of the secondary cell and transferring the converted voltage to the load node.

6. A fuel cell system comprising:
a fuel cell stack for producing power by an electrochemical reaction between fuel and an oxidizer;
a secondary cell for storing and discharging power;
a secondary cell voltage converting circuit for converting a voltage discharged from the secondary cell and for transferring the converted voltage to a load node where an output terminal of the fuel cell stack and a load are connected to the load node;
a voltage converting controller for controlling a conversion ratio of the secondary cell voltage converting circuit so that a voltage on an output line of the secondary cell voltage converting circuit and a voltage on an output line of the fuel cell stack are the same at the load node;
a charging circuit for charging the secondary cell with power produced from the fuel cell stack; and
a driving controller for controlling at least two output modes of the fuel cell stack and operation of the charging circuit,
wherein the fuel cell stack is operated in one of the at least two output modes at which the fuel cell stack outputs power at different levels.

7. The fuel cell system according to claim 6, wherein the driving controller controls operation of the fuel cell according to the following method:
   supplying power produced by operating the fuel cell stack in a maximum output mode to the load while concurrently charging the secondary cell with the power produced by operating the fuel cell when an amount of charge of the secondary cell is smaller than a first standard value;
   supplying both power produced by operating the fuel cell stack in a stable output mode and the power discharged by the secondary cell to the load when the amount of charge of the secondary cell is larger than a second standard value; and
   maintaining an existing output mode among the output modes when the amount of charge of the secondary cell is larger than the first standard value and smaller than the second standard value.

8. The fuel cell system according to claim 6, further comprising a load switch disposed between an output of the secondary cell and the load.

9. The fuel cell system according to claim 6, further comprising a first voltage measuring apparatus for measuring an output voltage of the secondary cell; and a second voltage measuring apparatus for measuring voltage at the load.

10. The fuel cell system according to claim 6, further comprising a third voltage measuring apparatus for measuring a voltage at the output of the fuel cell stack.

11. The fuel cell system according to claim 6, further comprising:
   a first diode in the electrical path between the fuel cell stack and the load node; and
   a second diode in the electrical path between the secondary cell and the load node.

* * * * *